United States Patent
Sim et al.

(10) Patent No.: US 9,552,267 B2
(45) Date of Patent: Jan. 24, 2017

(54) SATA RECEIVER EQUALIZATION MARGIN DETERMINATION/SETTING METHOD AND APPARATUS

(71) Applicant: Intel Corporation, Santa Clara, CA (US)

(72) Inventors: Chee Keong Sim, Serendah (MY); Kai Chong Ng, Butterworth (MY); Tze Ming Hau, Seremban (MY)

(73) Assignee: Intel Corporation, Santa Clara, CA (US)

(*) Notice: Subject to any disclaimer, the term of this patent is extended or adjusted under 35 U.S.C. 154(b) by 70 days.

(21) Appl. No.: 14/564,869

(22) Filed: Dec. 9, 2014

(65) Prior Publication Data

US 2016/0162379 A1    Jun. 9, 2016

(51) Int. Cl.
| | | |
|---|---|---|
| G06F 9/00 | (2006.01) | |
| G06F 11/22 | (2006.01) | |
| G06F 9/44 | (2006.01) | |

(52) U.S. Cl.
CPC ......... *G06F 11/2284* (2013.01); *G06F 9/4401* (2013.01)

(58) Field of Classification Search
CPC .... G06F 9/44502; G06F 9/44508; G06F 1/24; G06F 9/44526; G06F 15/177; G06F 9/44514; G06F 9/44523; G06F 11/1417; G06F 9/44505

See application file for complete search history.

(56) References Cited

U.S. PATENT DOCUMENTS

| | | |
|---|---|---|
| 2009/0007155 A1 | 1/2009 | Jones et al. |
| 2011/0106997 A1* | 5/2011 | Romero ............... G06F 3/0607 710/300 |
| 2011/0191637 A1 | 8/2011 | Wight et al. |

FOREIGN PATENT DOCUMENTS

WO    WO2008045670 A2    4/2008

OTHER PUBLICATIONS

International Search Report and Written Opinion mailed Feb. 16, 2016 for International Application No. PCT/US2015/058871, 11 pages.
Alan Sguigna, "SIV versus SMV—Part 2," Asset Intertech Blog Home, Intel IBIST, May 5, 2013, 4 pages, retrieved: http://blog.asset-intertech.com/test_data-out/2013/05/siv-versus-smv-part-2.html.

(Continued)

*Primary Examiner* — Zahid Choudhury
(74) *Attorney, Agent, or Firm* — Schwabe, Williamson & Wyatt, P.C.

(57) ABSTRACT

Apparatuses, methods and storage medium associated with automatic SATA receiver equalization margin determination and setting, are disclosed. In embodiments, an apparatus may comprise a BIOS configured to determine, during POST, whether a device is attached to one of the SATA ports, and on determination that a device is attached to one of the SATA ports, further determine whether a receiver equalization margin has been set for the device. Additionally, the BIOS may be configured to perform a DTLE training to dynamically determine and set the receiver equalization margin for the device, on determination that a receiver equalization margin has not been set for the device. Other embodiments may be described and/or claimed.

25 Claims, 6 Drawing Sheets

(56) References Cited

OTHER PUBLICATIONS

Tim Caffee, "Margin analysis emerges as imperative validation technique," Evaluation Engineering, vol. 53, No. 8, Aug. 2014, pp. 28-31, retrieved: http://www4.evaluationengineering.com/ebok/201408/resources/index.htm.
Seagate Product Manual, "Serial Attached SCSI (SAS)", Dec. 2009, 252 pages.

\* cited by examiner

SATA RECEIVER EQUALIZATION MARGIN DETERMINATION/SETTING METHOD AND APPARATUS

TECHNICAL FIELD

The present disclosure relates to the field of computing. More particularly, the present disclosure relates to automatic determination and setting of SATA receiver equalization margins for SATA devices.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

Serial ATA (Advanced Technology Attachment), also referred to as SATA, adapters and interfaces are very popular adapters/interfaces for attaching devices, e.g., storage devices, to computing platforms. Currently, SATA receiver equalization margin settings for the various SATA devices are manually tuned and statically set. The manual process typically involves performance of margin analysis, sweeping across the entire receiver equalization range from 0x0 to 0xF, using an electrical margin tool. On identifying the optimal receiver equalization margins for the various SATA devices, the settings are then statically coded into the basic input-output system (BIOS) of the various computing platform designs. With the plethora of SATA devices in various form factors, and various computing platform designs, this is inefficient, and burdensome to the computing platform designer.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

DETAILED DESCRIPTION

Figure 1:
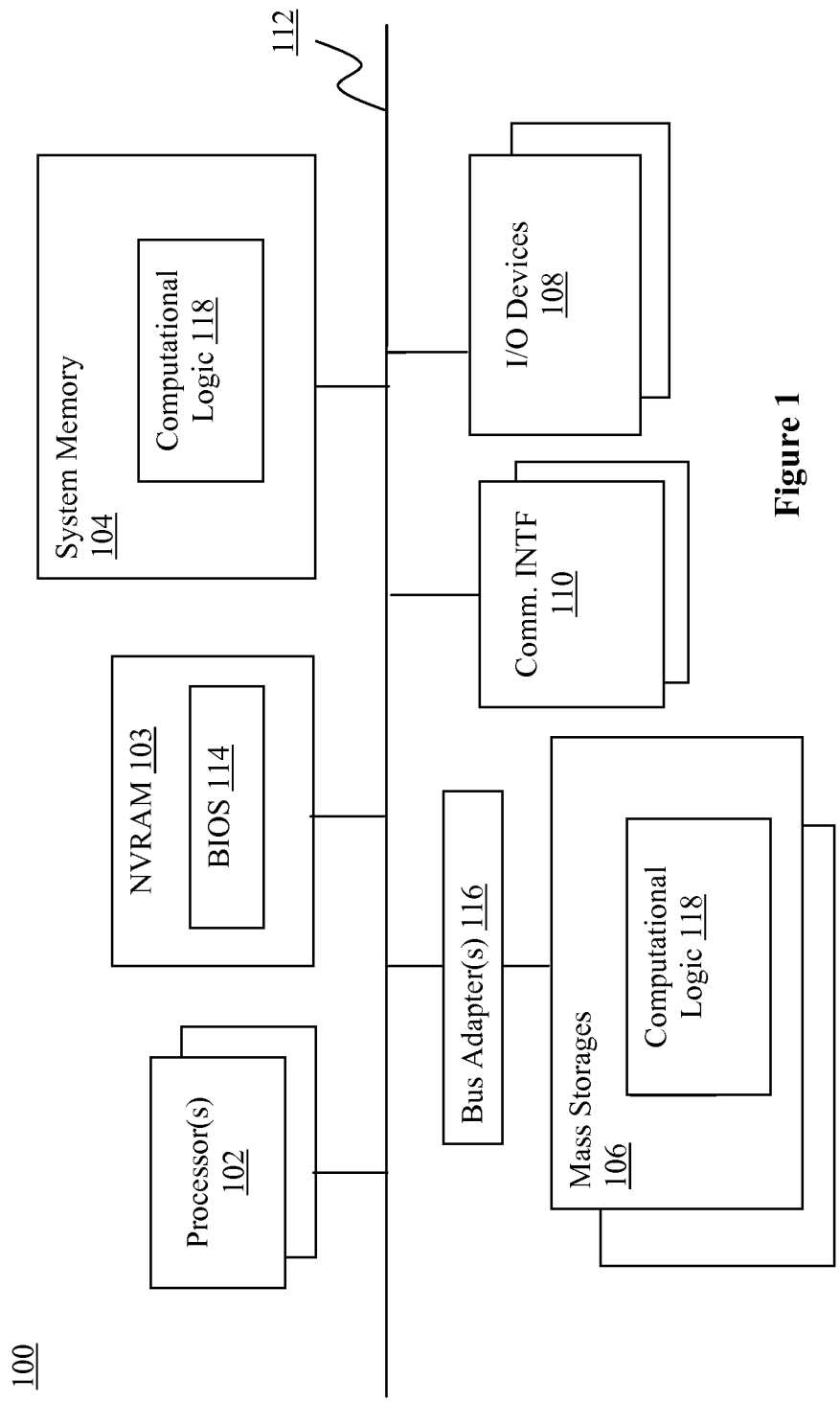
FIG. 1 illustrates an example computing system incorporated with the SATA receiver equalization margin determination and setting teachings of the present disclosure, according to various embodiments.

Apparatuses, methods and storage medium associated with automatic SATA receiver equalization margin determination and setting, are disclosed. In embodiments, an apparatus may comprise a BIOS configured to determine, during POST, whether a device is attached to one of the SATA ports, and on determination that a device is attached to one of the SATA ports, further determine whether a receiver equalization margin has been set for the device. Additionally, the BIOS may be configured to perform a DTLE training to dynamically determine and set the receiver equalization margin for the device, on determination that a receiver equalization margin has not been set for the device.

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Aspects of the disclosure are disclosed in the accompanying description. Alternate embodiments of the present disclosure and their equivalents may be devised without parting from the spirit or scope of the present disclosure. It should be noted that like elements disclosed below are indicated by like reference numbers in the drawings.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the term "module" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

Referring now to FIG. 1, wherein an example computing system incorporated with the SATA receiver equalization margin determination and setting teachings of the present disclosure, according to various embodiments, is shown. As illustrated, computing system 100 may include one or more processors 102, non-volatile random access memory (NVRAM) 103, and system memory 104. Each processor 102 may include one or more processor cores. NVRAM 103 may include BIOS 114, and system memory 104 may include non-persistent copies of the operating system and various applications, collectively denoted as computational logic 118. Additionally, computing system 100 may include one or more bus adapters/interfaces 116, mass storage devices 106 (coupled with bus adapters/interfaces 116), input/output devices 108, and communication interfaces 110. Examples of NVRAM 103 may include, but are not limited to, serial peripheral interface (SPI) Flash or embedded multi-memory card (eMMC). Mass storage devices 106 may include persistent copies of computational logic 118. The elements 102-104, 108-110 and 114-116 may be coupled to each other via system bus 112, which may represent one or more buses. In the case of multiple buses, they may be bridged by one or more bus bridges (not shown). In embodiments, at least one of bus adapters/interfaces 116 may be a SATA bus adapter/interface having one or more ports, and at least one of mass storage devices 106 may be a SATA device. Further, BIOS 114 may be configured to automatically determine and set receiver equalization margins for SATA devices during boot up of computing system 100, to be described more fully below.

Examples of mass storage devices 106 may include, but are not limited to, diskettes, hard drives, compact disc read-only memory (CD-ROM) and so forth. Examples of input/output devices 108 may include, but are not limited to, displays, keyboards, cursor controls and so forth. Examples of communication interfaces 110 may include, but are not limited to, wired and/or wireless network interface cards, modems and so forth. Communication interfaces 110 may support a variety of wired or wireless communications including, but are not limited, 3G/4G/5G, WiFi, Bluetooth®, Ethernet, and so forth.

Except for automatic SATA receiver equalization margin determination and setting, according to the present disclosure, each of these elements 102-118 may perform its conventional functions known in the art. The number, capability and/or capacity of these elements 102-118 may vary, depending on whether computing system 100 is used as a client device or a server. When used as a client device, the capability and/or capacity of these elements 102-118 may vary, depending on whether the client device is a stationary or mobile device, like a wearable device, a smartphone, a computing tablet, an ultrabook or a laptop. Otherwise, the constitutions of elements 102-118 are known, and accordingly will not be further described.

Figure 2:
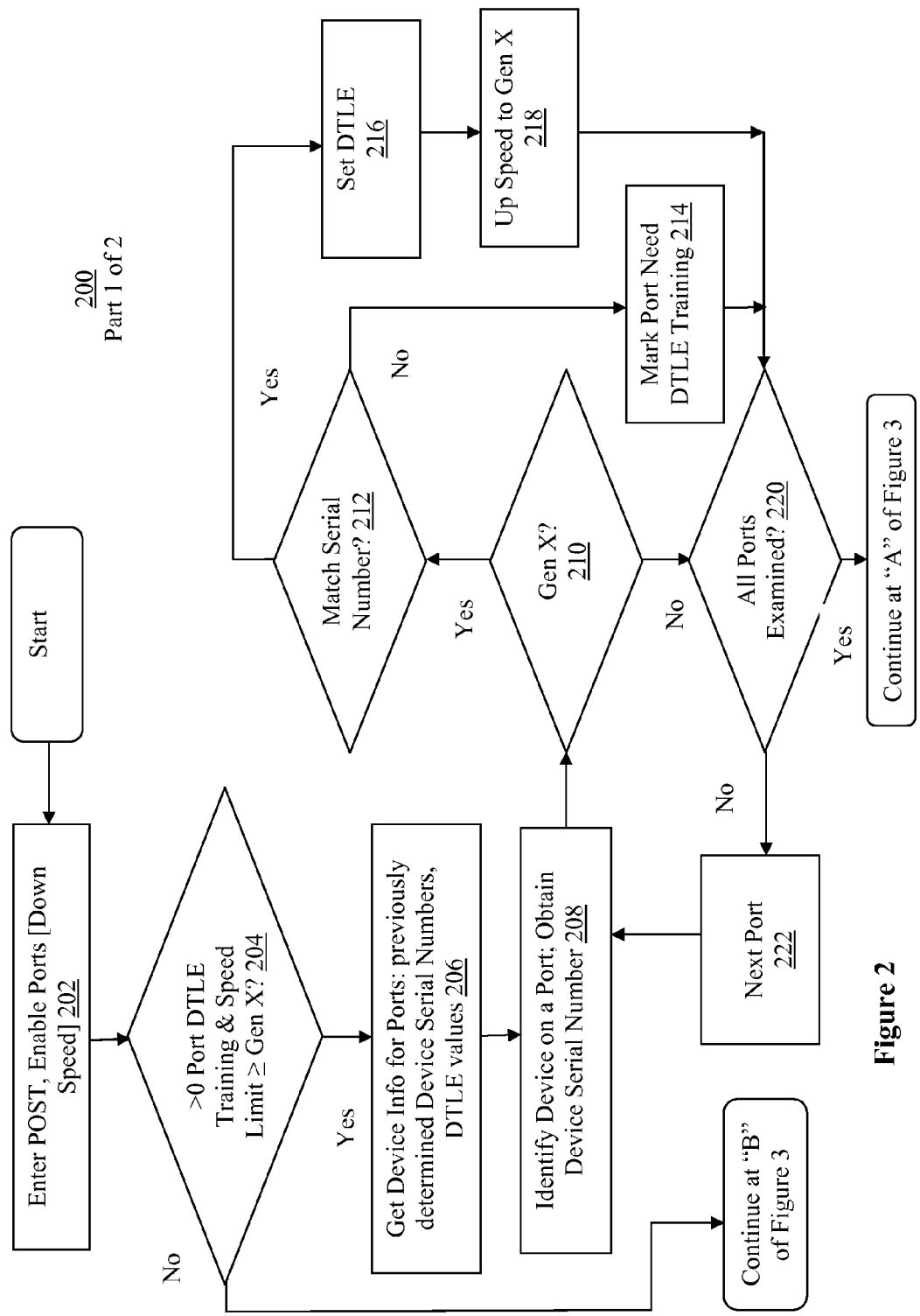
FIGS. 2-3 illustrate an example boot process incorporated with the SATA receiver equalization margin determination and setting teachings of the present disclosure, according to various embodiments.
Figure 3:
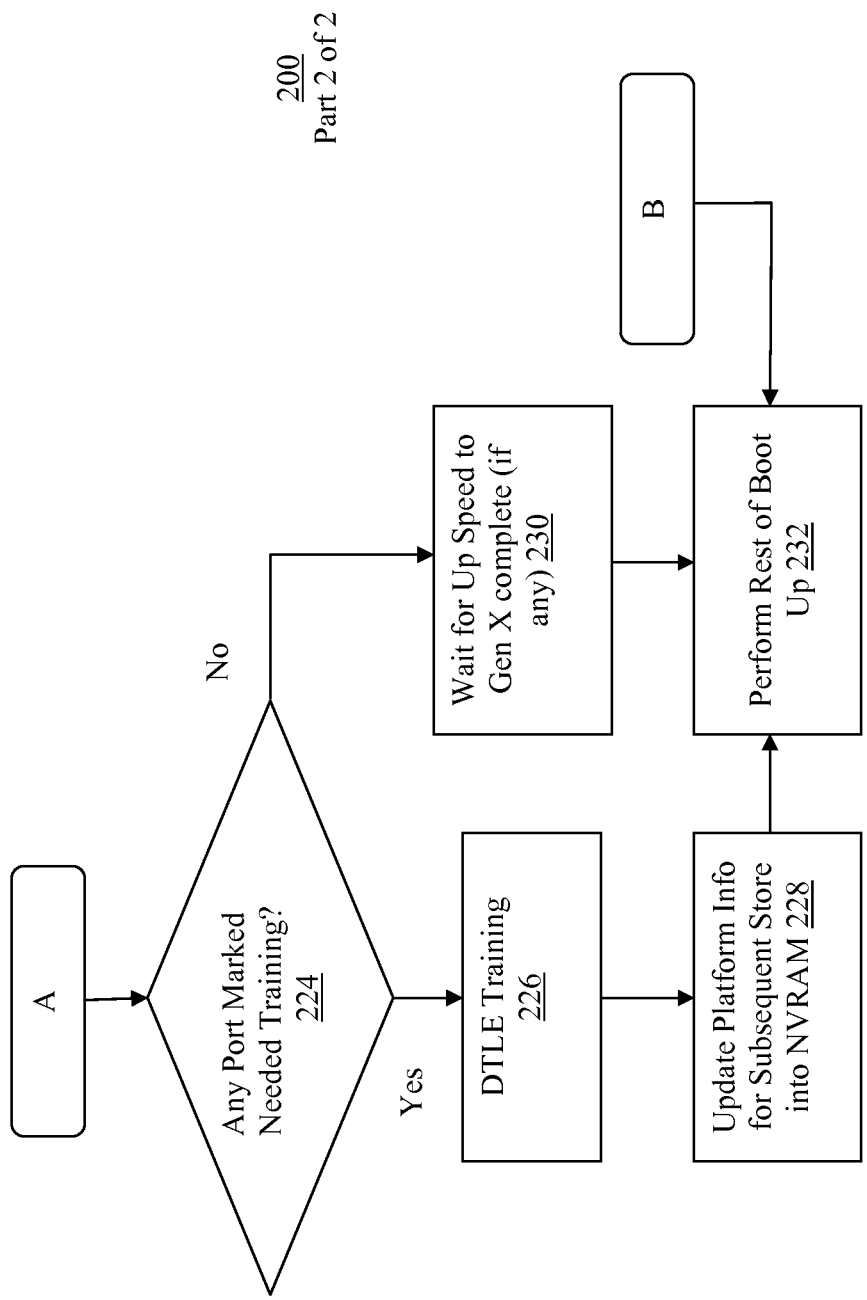

Referring now to FIGS. 2-3, wherein an example process for booting up computing system 100, according to various embodiments, is shown. As illustrated, process 200 for booting up computing system 100 may include operations performed in blocks 202-232. The operations may be performed, e.g., by BIOS 114 of FIG. 1. In other embodiments, process 200 may be performed without some of the operations, with additional operations and/or with different orders of the operations.

Process 200 may start at block 202. At block 202, process 200 may enter the POST phase. As an initial matter, on entry into the POST phase, all SATA ports may be enabled. Further, in view of the fact that there are many generations of SATA ports, with the newer generations supporting a much higher operating speed (e.g., version 3.2 of $3^{rd}$ generation supports 16 Gbit/sec) versus the older generations supporting a much lower operating speed (e.g., $1^{st}$ generation supports 1.5 Gbit/sec), and determination of receiver equalization margin may be difficult, therefore, to reduce the risk of encountering these difficulties, enablement of a SATA port may include temporarily reducing the operating speed of a later generation SATA port to the operating speed of an earlier generation SATA port (also referred to as "down speed").

Figure 4:
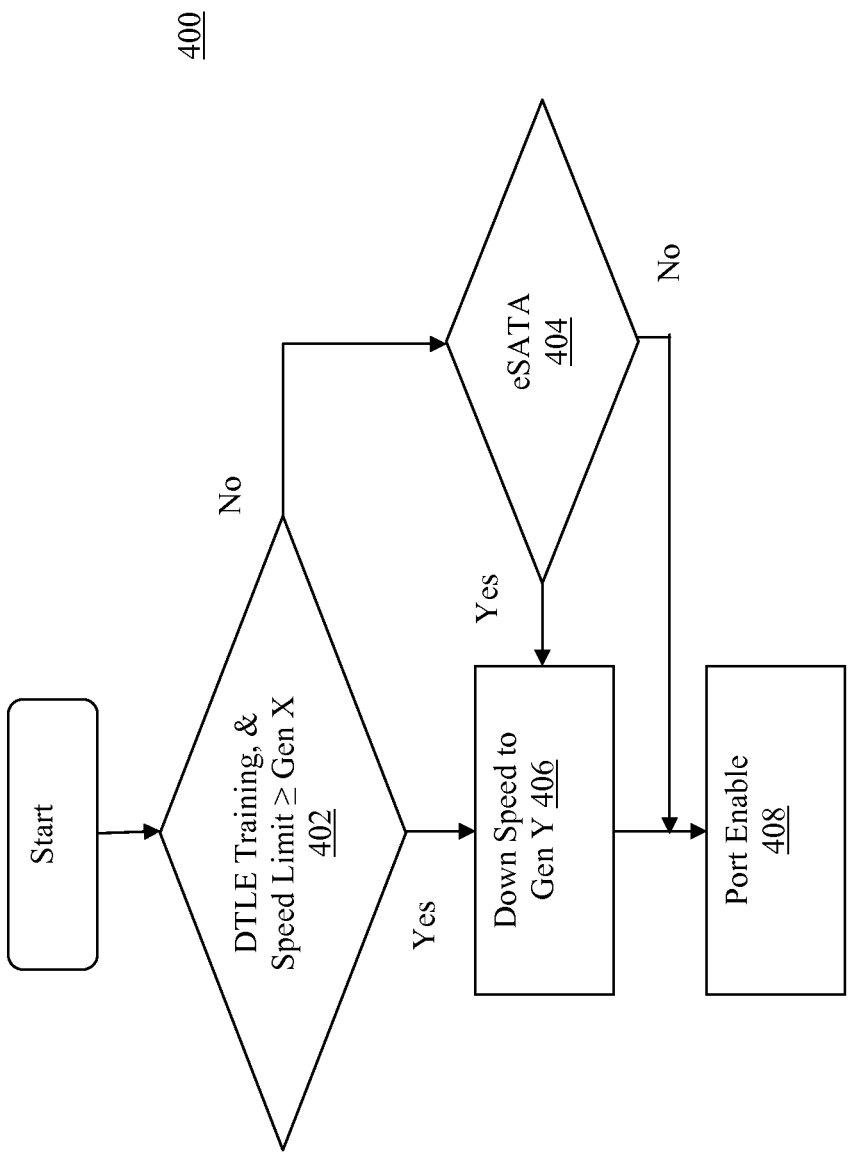
FIG. 4 illustrates an example process for entering the power-on self-test (POST) phase of the boot process and enabling all SATA ports, according to the various embodiments.

Referring now also to FIG. 4, wherein an example process for enabling and downing speed of a SATA port, according to various embodiments, is shown. Process 400 may be performed for each SATA port to be enabled. As illustrated, process 400 for enabling a SATA port, and selectively reducing the operating speed of the SATA port, may include operations performed at blocks 402-408. As described earlier, the operations may be performed, e.g., by BIOS 114 of FIG. 1. In other embodiments, process 400 may be performed without some of the operations, with additional operations and/or with different orders of the operations.

Process 400 may start at block 402. At block 402, a determination may be made on whether the SATA port is to be provided with DTLE training support, and whether the SATA port is of a generation that supports high speed operation that could lead to receiver equalization margin detection issue (denoted as Gen X). In embodiments, whether a SATA port is to be provided with DTLE training support may be determined in accordance with one or more operational policies stored, e.g., in NVRAM 103. Similarly, the generation level of a SATA port may be determined in accordance with configuration information stored, e.g., in NVRAM 103.

On determination of either the SATA port is not to be provided with DTLE training support, or the SATA port has an operating speed of a generation older than Gen X, process 400 may continue at block 404. At block 404, a further determination may be made on whether the SATA port is an external SATA (eSATA) port.

On determination at block 402 that the SATA port is to be provided with DTLE training support, and the SATA port is at least Gen X (or beyond), or on determination at block 404 that the SATA port is an eSATA port, process 400 may continue at block 406. At block 406, the operating speed of the SATA port may be temporarily reduced to a lower operating speed of an older generation that would not have receiver equalization margin detection issue (denoted as Gen Y).

On determination at block 404 that the SATA port is not an eSATA port, or on reducing the operating speed of the SATA port at block 406, process 400 may continue at block 408. At block 408, the SATA port may be enabled.

Process 400 may be repeated for each SATA port of SATA bus adapter/interface 116. In embodiments, Gen X may be Gen 3 and Gen Y may be Gen 2.

Referring back to FIGS. 2-3, on completion of the operations at block 202, process 200 may continue at block 204. At block 204, a determination may be made on whether at block 202, at least one SATA port is determined to be provided with DTLE training support and its operating speed is Gen X or beyond. On determination that at block 202 no SATA port was determined to be provided with DTLE training support or none of their operating speeds is Gen X or beyond, process 200 may continue at block 232 (through label "B" of FIG. 3) to continue with the rest of boot up, skipping all operations of blocks 206-230 associated with receiver equalization margin determination and setting.

However, on determination at block 202 that at least one SATA port is determined to be provided with DTLE training and its operating speed is Gen X or beyond, process 200 may continue at block 206. At block 206, configuration information associated with the SATA ports, including e.g., previously determined device serial numbers and DTLE values, may be obtained (e.g., from NVRAM 103).

Next, at block 208, the current device attached to the SATA port may be identified, and its serial number obtained (e.g., from the device). Then, at block 210, a determination may be made on whether the current device is a Gen X (or beyond) device. Next, on determination that the current device is a Gen X (or beyond) device, at block 212, a determination may be made on whether the previously determined serial number obtained for the port and the serial number of the device currently attached to the SATA port matches.

Next, on determination that the two serial numbers do not match, at block 214, a record may be made indicating the SATA port requires DTLE training. Alternatively, on determination that the two serial numbers do match, at block 216, the DTLE value of the SATA port may be set to the previous DTLE value obtained. Next, at block 218, the operating speed of the SATA port may be increased back to Gen X (or beyond) prior to its speed having been reduced.

Next, on completion of either the operations at block 214 or 218, process 200 may proceed to block 220. At block 220, a determination may be made with respect to whether all SATA ports have been examined. If not, process 200 may proceed to block 202, where the SATA port to be analyzed may be set to the next SATA port, and continue at block 208 and therefrom, as earlier described. On the other hand, if it is determined at block 220 that all SATA ports have been examined, process 200 may continue at block 224 (connected through label A of FIG. 3).

At block 224, a determination may be made on whether there has been any record made indicating a SATA port needs DTLE training. On determination that at least one SATA port needs DTLE training, process 200 may proceed to block 226. At block 226, DTLE training may be provided to all SATA ports noted as needing DTLE training. Next at block 228, to ensure the boot process may complete expeditiously, platform information may be updated with the result of the DTLE trainings, i.e. the trained DTLE value and the storage device serial number, for subsequent storage into e.g., NVRAM 103 (in the next boot).

On the other hand, on determination at block 224 that no SATA port has been determined as needing DTLE training, process 200 may continue at block 230. At block 230, process 200 temporarily waits to ensure all previously initiated up speed operations to increase SATA ports' operating speeds back to their pre-reduction operating speeds (see, e.g., block 218) are completed.

On completion of updating the platform information at block 228, or on completion of waiting at block 230, process 200 may proceed to block 232. At block 232, the rest of the boot process, including the rest of POST and operations after POST, may be completed.

Figure 5:
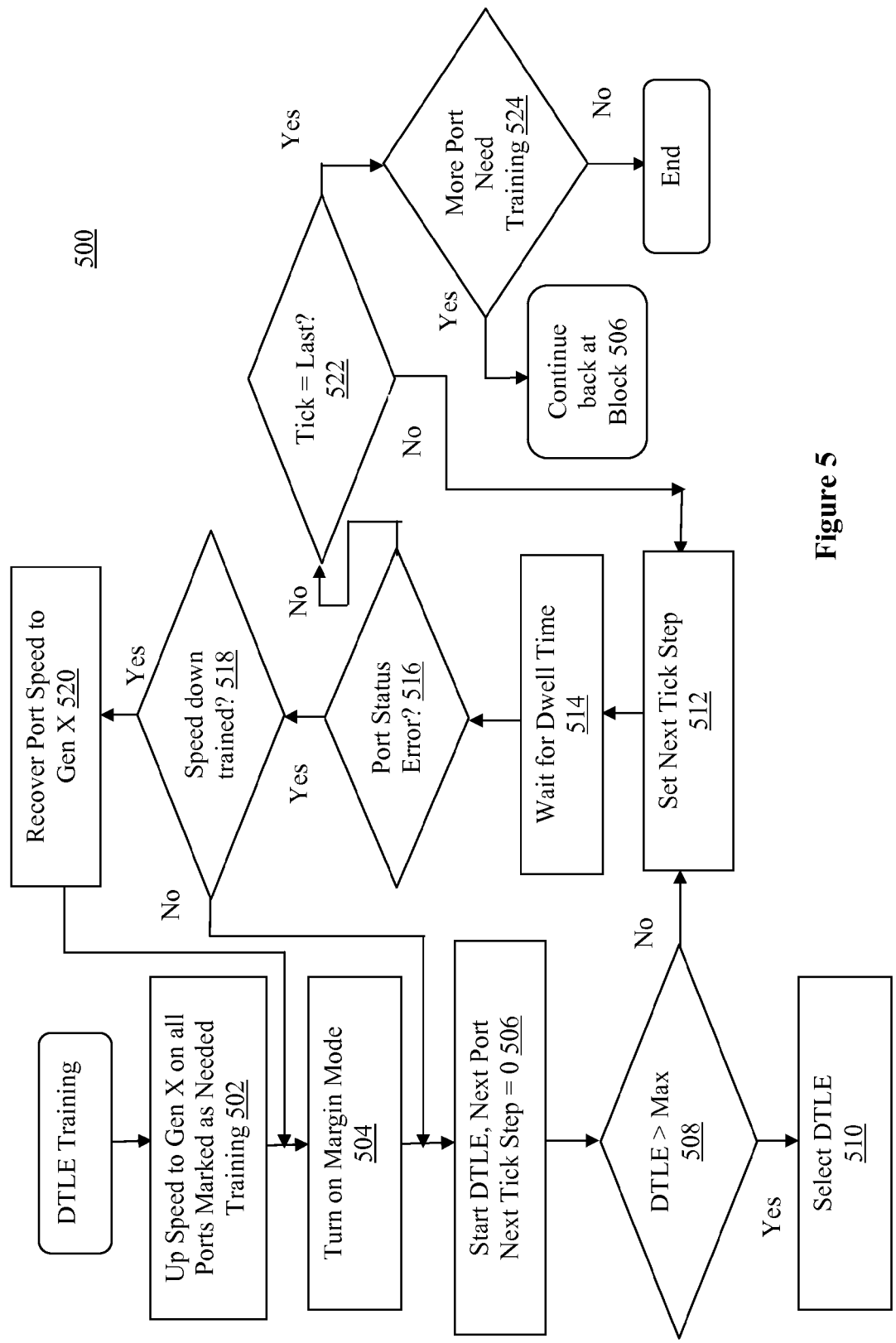
FIG. 5 illustrates an example process for performing discrete time linear equalization (DTLE) training for SATA devices, according to various embodiments.

Referring now to FIG. 5, wherein a process for performing DTLE training, according to various embodiments, is shown. As illustrated, process 500 for performing DTLE training for a SATA port may include operations at blocks 502-510. As described earlier, the operations may be performed, e.g., by BIOS 114 of FIG. 1. In other embodiments, process 500 may be performed without some of the operations, with additional operations and/or with different orders of the operations.

At block 502, the operating speeds of all SATA ports marked as needing DTLE training are increased back to their pre-reduction operating speeds (Gen X or beyond). Next at block 504, the computing platform is placed into a margin determination and setting mode.

Next, at block 506, DTLE training is started with tick step=0 (DTLE candidate value) for the next SATA port marked as needing training. Next, at block 508, a determination is made whether the current DTLE candidate value is greater than a predetermined maximum allowable DTLE value.

On determination at block 508 that the current DTLE candidate value is not greater than a predetermined maximum allowable DTLE value, process 500 continues at block 512. At block 512, the tick step is set to the next tick step value. Next, at block 514, process 500 waits for an amount of dwell time (e.g., 15 ms), then continues to block 516. At block 516, a determination is made on whether the SATA port's status indicates error. If the SATA port's status indicates no error, process 500 proceeds to block 522 and continues there from, to be further described.

However if the SATA port's status does not indicate an error, process 500 may proceed to block 518. At block 518, a determination is made on whether the operating speed of the SATA port was reduced. On determination that the operating speed of the SATA port was not previously reduced, process 500 returns to block 506 and continues there from for another SATA port as earlier described.

On the other hand, if it is determined at block 518, the operating speed of the SATA port was reduced, process 500 may proceed to block 520. At block 520, the port's speed may be recovered back to its pre-reduced speed, Gen X or beyond. From block 520, process 500 may return to block 504, and continue there from as earlier described.

At block 522, after determining that the port status does not indicate an error, a further determination may be made on whether the current tick step (DTLE candidate value) is the last tick step to be analyzed. On determination that the current tick step (DTLE candidate value) is not the last tick step to be analyzed, process 500 may return to block 512 and proceed therefrom to analyze another tick step (DTLE candidate value) as earlier described.

However, if it is determined that the current tick step (DTLE candidate value) is the last tick step to be analyzed, process 500 may proceed to block 524. At block 524, a determination may be made on whether there are still more SATA ports to be DTLE trained. On determining that there are still more SATA ports to be DTLE trained, process 500 may return to block 506 and continue therefrom to train another SATA port needing training, as earlier described. Otherwise, process 500 for DTLE training SATA ports to determine and set receiver equalization margin may end.

In embodiments, each SATA port is trained with a finite set of tick steps (DTLE candidate values), e.g., DTLE candidate values of {2, 4, 6, 8} via 5 steps of size 2, starting at step=0, spanning a subset but not the entire receiver equalization range. The range may be selected empirically in view of an amount of permissible impact on the overall boot time. That is, the DTLE candidate values may be optimally selected, such that the impact of the real time DTLE training on the overall boot time remains acceptable. From the above descriptions, it will be appreciated that the receiver equalization margin determination and setting operations of the present disclosure provide minimal impact to the overall boot time. Thus, for embodiments of computing systems configured to practice with fast boot processes (to provide better user experience), such fast boot processes will be minimally impacted by the automatic receiver equalization margin determination and setting of the present disclosure.

Figure 6:
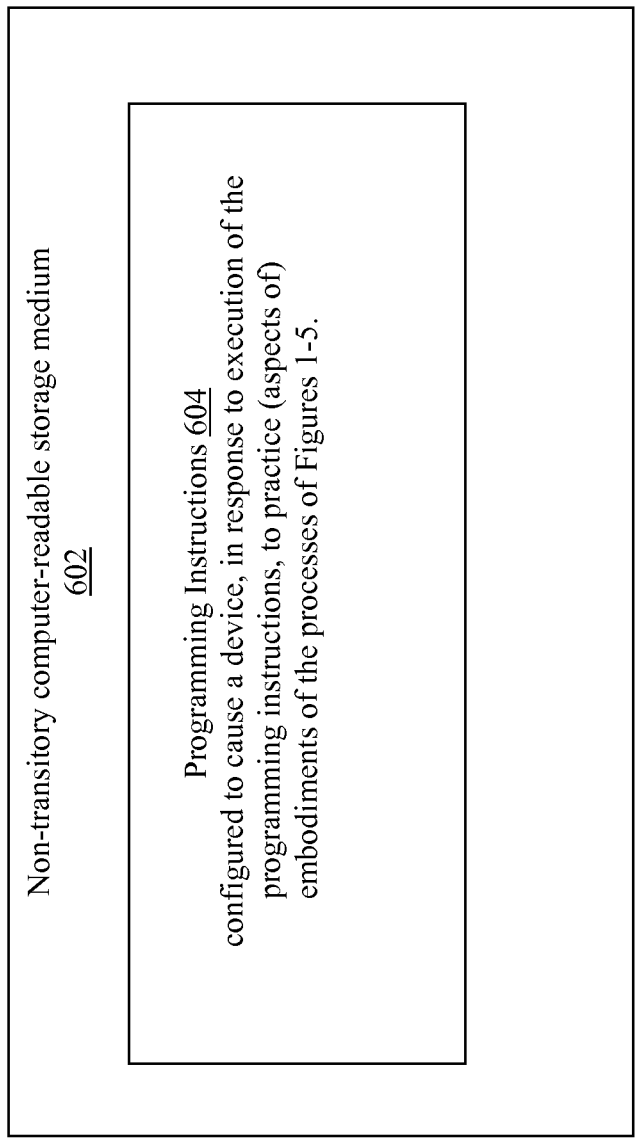
FIG. 6 illustrates a storage medium having instructions for practicing methods described with references to FIGS. 1-5, according to disclosed embodiments.

As will be appreciated by one skilled in the art, the present disclosure may be embodied as methods or computer program products. Accordingly, the present disclosure, in addition to being embodied in hardware as earlier described, may take the form of an entirely software embodiment (including firmware, resident software, micro-code, etc.) or an embodiment combining software and hardware aspects that may all generally be referred to as a "circuit," "module" or "system." Furthermore, the present disclosure may take the form of a computer program product embodied in any tangible or non-transitory medium of expression having computer-usable program code embodied in the medium. FIG. 6 illustrates an example computer-readable non-transitory storage medium that may be suitable for use to store instructions that cause an apparatus, in response to execution of the instructions by the apparatus, to practice selected aspects of the present disclosure. As shown, non-transitory computer-readable storage medium 602 may include a number of programming instructions 604. Programming instructions 604 may be configured to enable a device, e.g., computing system 100, in response to execution of the programming instructions, to perform, e.g., various operations associated with BIOS 114 of FIG. 1 and/or process 200 (including processes 400 and 500) of FIGS. 2-5. In alternate embodiments, programming instructions 604 may be disposed on multiple computer-readable non-transitory storage media 602 instead. In alternate embodiments, programming instructions 604 may be disposed on computer-readable transitory storage media 602, such as, signals.

Any combination of one or more computer-usable or computer-readable medium(s) may be utilized. The computer-usable or computer-readable medium may be, for example, but is not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer-usable program code may be transmitted using any appropriate medium, including but not limited to wireless, wireline, optical fiber cable, RF, etc.

Computer program code for carrying out operations of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means that implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a," "an" and "the" are intended to include plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments may be implemented as a computer process, a computing system or as an article of manufacture such as a computer program product of computer-readable media. The computer program product may be a computer storage medium readable by a computing system and encoding a computer program instructions for executing a computer process.

The corresponding structures, materials, acts, and equivalents of all means or steps plus function elements in the claims below are intended to include any structure, material or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill without departing from the scope and spirit of the disclosure. The embodiment was chosen and described in order to best explain the principles of the disclosure and the practical application, and to enable others of ordinary skill in the art to understand the disclosure for embodiments with various modifications as are suited to the particular use contemplated.

Referring back to FIG. 1, for one embodiment, at least one of processors 102 may be packaged together with NVRAM 103 having BIOS 114. For one embodiment, at least one of processors 102 may be packaged together with NVRAM 103 having BIOS 114 to form a System in Package (SiP). For one embodiment, at least one of processors 102 may be integrated on the same die with NVRAM 103 having BIOS 114. For one embodiment, at least one of processors 102 may be packaged together with NVRAM 103 having BIOS 114 to form a System on Chip (SoC). For at least one embodiment, the SoC may be utilized in, e.g., but not limited to, a wearable device, a smartphone or a computing tablet.

Thus various example embodiments of the present disclosure have been described including, but are not limited to:

Example 1 may be an apparatus for computing. The apparatus may comprise: one or more processors; one or more serial advance technology attachment (SATA) ports; and a basic input-output system (BIOS). The BIOS is to be operated by the one or more processors to: determine, during a power on self test (POST) phase of boot up of the apparatus, whether a device is attached to a first of the one or more SATA ports. The BIOS is to further determine, on determination that a device is attached to the first SATA port, whether a receiver equalization margin has been set for the device; and to perform, on determination that a receiver equalization margin has not been set for the device, a discrete time linear equalization (DTLE) training to dynamically determine and set the receiver equalization margin for the device.

Example 2 may be example 1, wherein the BIOS, on entry into the POST phase, may enable the one or more SATA ports, including, for each SATA port, determination of whether it is necessary to down speed the SATA port, and on determination it is necessary, down speed the SATA port.

Example 3 may be example 2, wherein the BIOS may determine whether it is necessary to down speed the SATA port via determination of whether DTLE support is to be provided for the SATA port, and whether the SATA port is of a particular generation of SATA ports; and wherein the BIOS is to further determine whether it is necessary to down speed the SATA port via determination of whether the SATA port is an external SATA (eSATA) port.

Example 4 may be any one of examples 1-3, wherein to determine whether a receiver equalization margin has been set for the device attached to the first SATA port, the BIOS is to: get prior device information associated with the first SATA port, including a device serial number and the DTLE value previously associated with the first SATA port; identify and obtain serial number for the device currently attached to the first SATA port; determine whether the first SATA port is of a particular generation; and on determination that the first SATA port is of the particular generation, determine whether the serial numbers match.

Example 5 may be example 4, wherein to determine whether a receiver equalization margin has been set for the device attached to the first SATA port, the BIOS, on determination that the serial numbers do not match, may further mark the first SATA port as needing DTLE training; and on determination that the serial numbers do match, set the DTLE value of the first SATA port to the prior DTLE value, and up speed the first SATA port to the particular generation.

Example 6 may be any one of examples 1-5, wherein to perform a DTLE training to dynamically determine and set the receiver equalization margin for the device attached to the first SATA port, the BIOS may up speed all SATA ports to an operating speed of a particular generation, and turn on a margin mode.

Example 7 may be example 6, wherein to perform a DTLE training to dynamically determine and set the receiver equalization margin for the device attached to the first SATA port, the BIOS may further iteratively test the first SATA port for a number of predetermined DTLE value candidates, starting with a lowest one of the DTLE value candidates, and at each iteration, determine whether a current DTLE value candidate exceeds a maximum DTLE value, and on determination that the current DTLE value candidate does not exceed the maximum DTLE value, increment the current DTLE value candidate to a next higher one of the DTLE value candidates, wherein the number of predetermined DTLE value candidates iterated sweeps a subset but not an entire receiver equalization range.

Example 8 may be example 7, wherein during each iteration, prior to increment of the current DTLE value candidate to a next higher one of the DTLE value candidates, the BIOS may further determine whether status of the first SATA port indicates error, and on determination that the status of the first SATA port does not indicate error, the BIOS is to continue with increment of the current DTLE value candidate to a next higher one of the DTLE value candidates.

Example 9 may be example 8, wherein on determination that the status of the first SATA port indicates error, the BIOS may further determine whether the speed of the first SATA port has been down trained, and on determination that the speed of the first SATA port has been down trained, recover the speed of the first SATA port to a particular generation of SATA ports.

Example 10 may be any one of examples 7-9, wherein the BIOS, on determination that the current DTLE value candidate exceeds the maximum DTLE value, may select a DTLE for the first SATA port among the DTLE candidate values iterated.

Example 11 may be a method for computing. The method may comprise: during boot up of a computing system, determining, by a basic input-output system (BIOS) of the computing system, during a power on self test (POST) phase of the boot up, whether a device is attached to a serial advance technology attachment (SATA) port. The method may further comprises on determining that a device is attached to the SATA port, further determining, by the BIOS, whether a receiver equalization margin has been set for the device; and on determining that a receiver equalization margin has not been set for the device, performing a discrete time linear equalization training to dynamically determine and set the receiver equalization margin for the device.

Example 12 may be example 11, further comprising, on entry into the POST phase, the BIOS enabling the one or more SATA ports, including, for each SATA port, determining whether it is necessary to down speed the SATA port, and on determining it is necessary, down speed the SATA port.

Example 13 may be example 12, wherein determining whether it is necessary to down speed the SATA port comprising determining whether DTLE support is to be provided for the SATA port, and whether the SATA port is of a particular generation of SATA ports or whether the SATA port is an external SATA (eSATA) port.

Example 14 may be any one of examples 11-13, wherein determining whether a receiver equalization margin has been set for the device attached to the first SATA port, comprises: getting prior device information associated with the first SATA port, including a device serial number and the DTLE value previously associated with the first SATA port; identifying and obtaining serial number for the device currently attached to the first SATA port; determining whether the first SATA port is of a particular generation; and on determining that the first SATA port is of the particular generation, determining whether the serial numbers match.

Example 15 may be example 14, wherein determining whether a receiver equalization margin has been set for the device attached to the first SATA port, comprise: the BIOS, on determining that the serial numbers do not match, marking the first SATA port as needing DTLE training; and on determining that the serial numbers do match, setting the DTLE value of the first SATA port to the prior DTLE value, and upping speed the first SATA port to the particular generation.

Example 16 may be any one of examples 11-14, wherein performing a DTLE training to dynamically determine and set the receiver equalization margin for the device attached to the first SATA port, comprises: upping speed all SATA ports to an operating speed of a particular generation, and turning on a margin mode.

Example 17 may be example 16, wherein performing a DTLE training to dynamically determine and set the receiver equalization margin for the device attached to the first SATA port, comprises iteratively testing the first SATA port for a number of predetermined DTLE value candidates, starting with a lowest one of the DTLE value candidates, and at each iteration, determining whether a current DTLE value candidate exceeds a maximum DTLE value, and on determining that the current DTLE value candidate does not exceed the maximum DTLE value, incrementing the current DTLE value candidate to a next higher one of the DTLE value candidates, wherein the number of predetermined DTLE value candidates iterated sweeps a subset but not an entire receiver equalization range.

Example 18 may be example 17, wherein during each iteration, prior to incrementing the current DTLE value candidate to a next higher one of the DTLE value candidates, the BIOS further determining whether status of the first SATA port indicates error, and on determining that the status of the first SATA port does not indicate error, the BIOS continuing with the incrementing the current DTLE value candidate to a next higher one of the DTLE value candidates.

Example 19 may be example 18, wherein on determining that the status of the first SATA port indicates error, the BIOS further determining whether the speed of the first SATA port has been down trained, and on determining that the speed of the first SATA port has been down trained, recovering the speed of the first SATA port to a particular generation of SATA ports.

Example 20 may be any one of examples 17-19, wherein performing a DTLE training further comprises selecting a DTLE for the first SATA port among the DTLE candidate values iterated, on determining that the current DTLE value candidate exceeds the maximum DTLE value.

Example 21 may be at least one computer-readable storage medium comprising instructions to cause a computing apparatus, in response to execution of the instructions by the computing apparatus, to implement a basic input-output system (BIOS) for the computing apparatus. The BIOS may perform a number of operations during boot up of a computing system, including: determination, during a power on self test (POST) phase of the boot up, of whether a device is attached to a serial advance technology attachment (SATA) port; determination of whether a receiver equalization margin has been set for the device, on determination that a device is attached to the SATA port, further; and performance of a discrete time linear equalization training to dynamically determine and set the receiver equalization margin for the device, on determination that a receiver equalization margin has not been set for the device.

Example 22 may be example 21, wherein the BIOS, on entry into the POST phase may enable the one or more SATA ports, including, for each SATA port, determination of whether it is necessary to down speed the SATA port, and on determination it is necessary, down speed the SATA port.

Example 23 may be example 22, wherein the BIOS may determine whether it is necessary to down speed the SATA port via determination of whether DTLE support is to be provided for the SATA port, and whether the SATA port is of a particular generation of SATA ports; and wherein the BIOS is to further determine whether it is necessary to down speed the SATA port via determination of whether the SATA port is an external SATA (eSATA) port.

Example 24 may be any one of examples 21-23, wherein to determine whether a receiver equalization margin has been set for the device attached to the first SATA port, the BIOS may: get prior device information associated with the first SATA port, including a device serial number and the DTLE value previously associated with the first SATA port; identify and obtain serial number for the device currently attached to the first SATA port; determine whether the first SATA port is of a particular generation; and on determination that the first SATA is port of the particular generation, determine whether the serial numbers match.

Example 25 may be example 24, wherein to determine whether a receiver equalization margin has been set for the device attached to the first SATA port, the BIOS, on determination that the serial numbers do not match, may further mark the first SATA port as needing DTLE training; and on determination that the serial numbers do match, set the DTLE value of the first SATA port to the prior DTLE value, and up speed the first SATA port to the particular generation.

Example 26 may be any one of examples 21-25, wherein to perform a DTLE training to dynamically determine and set the receiver equalization margin for the device attached to the first SATA port, the BIOS may up speed all SATA ports to an operating speed of a particular generation, and turn on a margin mode.

Example 27 may be example 26, wherein to perform a DTLE training to dynamically determine and set the receiver equalization margin for the device attached to the first SATA port, the BIOS is to further iteratively test the first SATA port for a number of predetermined DTLE value candidates, starting with a lowest one of the DTLE value candidates, and at each iteration, determine whether a current DTLE value candidate exceeds a maximum DTLE value, and on determination that the current DTLE value candidate does not exceed the maximum DTLE value, increment the current DTLE value candidate to a next higher one of the DTLE value candidates, wherein the number of predetermined DTLE value candidates iterated sweeps a subset but not an entire receiver equalization range.

Example 28 may be example 27, wherein during each iteration, prior to increment of the current DTLE value candidate to a next higher one of the DTLE value candidates, the BIOS may further determine whether status of the first SATA port indicates error, and on determination that the status of the first SATA port does not indicate error, the BIOS is to continue with increment of the current DTLE value candidate to a next higher one of the DTLE value candidates.

Example 29 may be example 28, wherein on determination that the status of the first SATA port indicates error, the BIOS may further determine whether the speed of the first SATA port has been down trained, and on determination that the speed of the first SATA port has been down trained, recover the speed of the first SATA port to a particular generation of SATA ports.

Example 30 may be any one of examples 27-29, wherein the BIOS, on determination that the current DTLE value candidate exceeds the maximum DTLE value, is to select a DTLE for the first SATA port among the DTLE candidate values iterated.

Example 31 may be an apparatus for computing. The apparatus may comprise: basic input-output system (BIOS) means for booting up the apparatus, including means for determining, during a power on self test (POST) phase of the boot up, whether a device is attached to a serial advance technology attachment (SATA) port. The BIOS means may further comprise means for determining whether a receiver equalization margin has been set for the device, on determining that a device is attached to the SATA port; and means for performing a discrete time linear equalization training to dynamically determine and set the receiver equalization margin for the device, on determining that a receiver equalization margin has not been set for the device.

Example 32 may be example 31, wherein the BIOS means may further comprise, means for enabling the one or more SATA ports, on entry into the POST phase, including, means for determining, for each SATA port, whether it is necessary to down speed the SATA port, and on determining it is necessary, down speed the SATA port.

Example 33 may be example 32, wherein means for determining whether it is necessary to down speed the SATA port may further comprise means for determining whether DTLE support is to be provided for the SATA port, and whether the SATA port is of a particular generation of SATA ports or whether the SATA port is an external SATA (eSATA) port.

Example 34 may be any one of examples 31-33, wherein means for determining whether a receiver equalization margin has been set for the device attached to the first SATA port, may comprise: means for getting prior device information associated with the first SATA port, including a device serial number and the DTLE value previously associated with the first SATA port; means for identifying and obtaining serial number for the device currently attached to the first SATA port; means for determining whether the first SATA port is of a particular generation; and means for determining whether the serial numbers match, on determining that the first SATA port is of the particular generation.

Example 35 may be example 34, wherein means for determining whether a receiver equalization margin has been set for the device attached to the first SATA port, may comprise: means for marking the first SATA port as needing DTLE training, on determining that the serial numbers do not match; and means for setting the DTLE value of the first SATA port to the prior DTLE value, and upping speed the first SATA port to the particular generation, on determining that the serial numbers do match.

Example 36 may be any one of examples 31-35, wherein means for performing a DTLE training to dynamically determine and set the receiver equalization margin for the device attached to the first SATA port, may comprise: means for upping speed all SATA ports to an operating speed of a particular generation, and turning on a margin mode.

The apparatus of claim 36, wherein means for performing a DTLE training to dynamically determine and set the receiver equalization margin for the device attached to the first SATA port, may comprise means for iteratively testing the first SATA port for a number of predetermined DTLE value candidates, starting with a lowest one of the DTLE value candidates, and at each iteration, determining whether a current DTLE value candidate exceeds a maximum DTLE value, and on determining that the current DTLE value candidate does not exceed the maximum DTLE value, incrementing the current DTLE value candidate to a next higher one of the DTLE value candidates, wherein the number of predetermined DTLE value candidates iterated sweeps a subset but not an entire receiver equalization range.

Example 38 may be example 37, wherein means for iteratively testing may comprise means for determining, during each iteration, prior to incrementing the current DTLE value candidate to a next higher one of the DTLE value candidates, whether status of the first SATA port indicates error, and on determining that the status of the first SATA port does not indicate error, continuing with the incrementing the current DTLE value candidate to a next higher one of the DTLE value candidates.

Example 39 may be example 38, wherein means for determining whether status of the first SATA port indicates error may comprise means for determining whether the speed of the first SATA port has been down trained, on determining that the status of the first SATA port indicates error; and on determining that the speed of the first SATA port has been down trained, recovering the speed of the first SATA port to a particular generation of SATA ports.

Example 40 may be any one of examples 37-39, wherein means for performing a DTLE training may comprise means for selecting a DTLE for the first SATA port among the DTLE candidate values iterated, on determining that the current DTLE value candidate exceeds the maximum DTLE value.

It will be apparent to those skilled in the art that various modifications and variations can be made in the disclosed embodiments of the disclosed device and associated methods without departing from the spirit or scope of the disclosure. Thus, it is intended that the present disclosure covers the modifications and variations of the embodiments disclosed above provided that the modifications and variations come within the scope of any claims and their equivalents.

What is claimed is:

1. An apparatus for computing, comprising:
one or more processors;
one or more serial advance technology attachment (SATA) ports; and
a basic input-output system (BIOS) to be operated by the one or more processors to:
determine, during a power on self test (POST) phase of boot up of the apparatus, whether a device is attached to a first of the one or more SATA ports;
on determination that a device is attached to the first SATA port, further determine whether a receiver equalization margin has been set for the device; and
on determination that a receiver equalization margin has not been set for the device, perform a discrete time linear equalization (DTLE) training to dynamically determine and set the receiver equalization margin for the device.

2. The apparatus of claim 1, wherein the BIOS, on entry into the POST phase, is to enable the one or more SATA ports, including, for each SATA port, determination of whether it is necessary to down speed the SATA port, and on determination it is necessary, down speed the SATA port.

3. The apparatus of claim 2, wherein the BIOS is to determine whether it is necessary to down speed the SATA port via determination of whether DTLE support is to be provided for the SATA port, and whether the SATA port is of a particular generation of SATA ports; and wherein the BIOS is to further determine whether it is necessary to down speed the SATA port via determination of whether the SATA port is an external SATA (eSATA) port.

4. The apparatus of claim 1, wherein to determine whether a receiver equalization margin has been set for the device attached to the first SATA port, the BIOS is to:
get prior device information associated with the first SATA port, including a device serial number and a DTLE value previously associated with the first SATA port;
identify and obtain a serial number for the device currently attached to the first SATA port;
determine whether the first SATA port is of a particular generation; and
on determination that the first SATA port is of the particular generation, determine whether the serial numbers match.

5. The apparatus of claim 4, wherein to determine whether a receiver equalization margin has been set for the device attached to the first SATA port, the BIOS, on determination that the serial numbers do not match, is to further mark the first SATA port as needing DTLE training; and on determination that the serial numbers do match, set the DTLE value of the first SATA port to the prior DTLE value, and up speed the first SATA port to the particular generation.

6. The apparatus of claim 1, wherein to perform a DTLE training to dynamically determine and set the receiver equalization margin for the device attached to the first SATA port, the BIOS is to up speed all SATA ports to an operating speed of a particular generation, and turn on a margin mode.

7. The apparatus of claim 6, wherein to perform a DTLE training to dynamically determine and set the receiver equalization margin for the device attached to the first SATA port, the BIOS is to further iteratively test the first SATA port for a number of predetermined DTLE value candidates, starting with a lowest one of the DTLE value candidates, and at each iteration, determine whether a current DTLE value candidate exceeds a maximum DTLE value, and on determination that the current DTLE value candidate does not exceed the maximum DTLE value, increment the current DTLE value candidate to a next higher one of the DTLE value candidates, wherein the number of predetermined DTLE value candidates iterated sweeps a subset but not an entire receiver equalization range.

8. The apparatus of claim 7, wherein during each iteration, prior to increment of the current DTLE value candidate to a next higher one of the DTLE value candidates, the BIOS is to further determine whether status of the first SATA port indicates error, and on determination that the status of the first SATA port does not indicate error, the BIOS is to continue with increment of the current DTLE value candidate to a next higher one of the DTLE value candidates.

9. The apparatus of claim 8, wherein on determination that the status of the first SATA port indicates error, the BIOS is to further determine whether the speed of the first SATA port has been down trained, and on determination that the speed of the first SATA port has been down trained, recover the speed of the first SATA port to a particular generation of SATA ports.

10. The apparatus of claim 7, wherein the BIOS, on determination that the current DTLE value candidate exceeds the maximum DTLE value, is to select a DTLE for the first SATA port among the DTLE value candidates iterated.

11. A method for computing, comprising:
during boot up of a computing system,
determining, by a basic input-output system (BIOS) of the computing system, during a power on self test (POST) phase of the boot up, whether a device is attached to a serial advance technology attachment (SATA) port;
on determining that a device is attached to the SATA port, further determining, by the BIOS, whether a receiver equalization margin has been set for the device; and
on determining that a receiver equalization margin has not been set for the device, performing a discrete time linear equalization training to dynamically determine and set the receiver equalization margin for the device.

12. The method of claim 11, wherein determining whether a receiver equalization margin has been set for the device attached to a first SATA port comprises:
getting prior device information associated with the first SATA port, including a device serial number and a DTLE value previously associated with the first SATA port;
identifying and obtaining a serial number for the device currently attached to the first SATA port;
determining whether the first SATA port is of a particular generation; and
on determining that the first SATA port is of the particular generation, determining whether the serial numbers match.

13. The method of claim 12, wherein determining whether a receiver equalization margin has been set for the device attached to the first SATA port comprises: the BIOS, on determining that the serial numbers do not match, marking the first SATA port as needing DTLE training; and on determining that the serial numbers do match, setting the DTLE value of the first SATA port to the prior DTLE value, and upping speed of the first SATA port to the particular generation.

14. The method of claim 11, wherein performing a DTLE training to dynamically determine and set the receiver equalization margin for the device attached to the first SATA port comprises: upping speed of all SATA ports to an operating speed of a particular generation, and turning on a margin mode.

15. The method of claim 14, wherein performing a DTLE training to dynamically determine and set the receiver equalization margin for the device attached to the first SATA port comprises iteratively testing the first SATA port for a number of predetermined DTLE value candidates, starting with a lowest one of the DTLE value candidates, and at each iteration, determining whether a current DTLE value candidate exceeds a maximum DTLE value, and on determining that the current DTLE value candidate does not exceed the maximum DTLE value, incrementing the current DTLE value candidate to a next higher one of the DTLE value candidates, wherein the number of predetermined DTLE value candidates iterated sweeps a subset but not an entire receiver equalization range.

16. At least one non-transitory computer-readable storage medium (CRM) comprising instructions to cause a computing apparatus, in response to execution of the instructions by the computing apparatus, to implement a basic input-output system (BIOS) for the computing apparatus, wherein the BIOS is to perform a number of operations during boot up of a computing system, including:
  determination, during a power on self test (POST) phase of the boot up, of whether a device is attached to a serial advance technology attachment (SATA) port;
  determination of whether a receiver equalization margin has been set for the device, on determination that a device is attached to the SATA port, further; and
  performance of a discrete time linear equalization training to dynamically determine and set the receiver equalization margin for the device, on determination that a receiver equalization margin has not been set for the device.

17. The CRM of claim 16, wherein the BIOS, on entry into the POST phase, is to enable one or more SATA ports, including, for each SATA port, determination of whether it is necessary to down speed the SATA port, and on determination it is necessary, down speed the SATA port.

18. The CRM of claim 17, wherein the BIOS is to determine whether it is necessary to down speed the SATA port via determination of whether DTLE support is to be provided for the SATA port, and whether the SATA port is of a particular generation of SATA ports; and wherein the BIOS is to further determine whether it is necessary to down speed the SATA port via determination of whether the SATA port is an external SATA (eSATA) port.

19. The CRM of claim 16, wherein to determine whether a receiver equalization margin has been set for the device attached to a first SATA port, the BIOS is to:
  get prior device information associated with the first SATA port, including a device serial number and a DTLE value previously associated with the first SATA port;
  identify and obtain a serial number for the device currently attached to the first SATA port;
  determine whether the first SATA port is of a particular generation; and
  on determination that the first SATA port is of the particular generation, determine whether the serial numbers match.

20. The CRM of claim 19, wherein to determine whether a receiver equalization margin has been set for the device attached to the first SATA port, the BIOS, on determination that the serial numbers do not match, is to further mark the first SATA port as needing DTLE training; and on determination that the serial numbers do match, set the DTLE value of the first SATA port to the prior DTLE value, and up speed the first SATA port to the particular generation.

21. The CRM of claim 16, wherein to perform a DTLE training to dynamically determine and set the receiver equalization margin for the device attached to a first SATA port, the BIOS is to up speed all SATA ports to an operating speed of a particular generation, and turn on a margin mode.

22. The CRM of claim 21, wherein to perform a DTLE training to dynamically determine and set the receiver equalization margin for the device attached to the first SATA port, the BIOS is to further iteratively test the first SATA port for a number of predetermined DTLE value candidates, starting with a lowest one of the DTLE value candidates, and at each iteration, determine whether a current DTLE value candidate exceeds a maximum DTLE value, and on determination that the current DTLE value candidate does not exceed the maximum DTLE value, increment the current DTLE value candidate to a next higher one of the DTLE value candidates, wherein the number of predetermined DTLE value candidates iterated sweeps a subset but not an entire receiver equalization range.

23. The CRM of claim 22, wherein during each iteration, prior to increment of the current DTLE value candidate to a next higher one of the DTLE value candidates, the BIOS is to further determine whether status of the first SATA port indicates error, and on determination that the status of the first SATA port does not indicate error, the BIOS is to continue with increment of the current DTLE value candidate to a next higher one of the DTLE value candidates.

24. The CRM of claim 23, wherein on determination that the status of the first SATA port indicates error, the BIOS is to further determine whether the speed of the first SATA port has been down trained, and on determination that the speed of the first SATA port has been down trained, recover the speed of the first SATA port to a particular generation of SATA ports.

25. The CRM of claim 22, wherein the BIOS, on determination that the current DTLE value candidate exceeds the maximum DTLE value, is to select a DTLE for the first SATA port among the DTLE value candidates iterated.

* * * * *